US012499191B1

(12) United States Patent
Gras

(10) Patent No.: US 12,499,191 B1
(45) Date of Patent: Dec. 16, 2025

(54) SYSTEM AND METHOD FOR VERIFYING UNIQUE USER IDENTIFICATION

(71) Applicant: Seaton Gras, Sequim, WA (US)

(72) Inventor: Seaton Gras, Sequim, WA (US)

(\*) Notice: Subject to any disclaimer, the term of this patent is extended or adjusted under 35 U.S.C. 154(b) by 0 days.

(21) Appl. No.: 18/596,498

(22) Filed: Mar. 5, 2024

Related U.S. Application Data

(63) Continuation of application No. 17/316,224, filed on May 10, 2021, now Pat. No. 11,921,830, which is a continuation of application No. 16/938,938, filed on Jul. 25, 2020, now Pat. No. 11,003,756.

(60) Provisional application No. 62/878,644, filed on Jul. 25, 2019.

(51) Int. Cl.
   *G06F 21/31*   (2013.01)
   *G06F 16/958*  (2019.01)
   *G07C 9/00*    (2020.01)

(52) U.S. Cl.
   CPC .......... *G06F 21/31* (2013.01); *G06F 16/958* (2019.01); *G07C 9/00563* (2013.01)

(58) Field of Classification Search
   CPC .... G06F 21/31; G06F 16/958; G07C 9/00563
   See application file for complete search history.

(56) References Cited

U.S. PATENT DOCUMENTS

| | | | |
|---|---|---|---|
| 6,980,081 B2 | 12/2005 | Anderson | |
| 7,636,855 B2 | 12/2009 | Applebaum et al. | |
| 8,117,458 B2 * | 2/2012 | Osborn, III | G06F 21/36 713/183 |
| 8,638,739 B2 * | 1/2014 | Oh | H04W 72/121 370/329 |
| 8,638,939 B1 | 1/2014 | Casey et al. | |
| 8,959,619 B2 | 2/2015 | Sanft et al. | |
| 9,064,104 B2 | 6/2015 | Riddiford | |
| 10,169,566 B1 * | 1/2019 | Mossoba | G06F 40/12 |
| 11,550,884 B2 * | 1/2023 | Kumar | G06Q 30/0251 |
| 2003/0210127 A1 | 11/2003 | Anderson | |
| 2004/0230843 A1 * | 11/2004 | Jansen | G06F 21/36 713/184 |
| 2005/0044425 A1 | 2/2005 | Hypponen | |
| 2007/0277224 A1 | 11/2007 | Osborn et al. | |
| 2007/0283416 A1 | 12/2007 | Renaud | |
| 2008/0229397 A1 * | 9/2008 | Basner | H04L 9/3271 726/5 |
| 2008/0235784 A1 | 9/2008 | Basner et al. | |

(Continued)

OTHER PUBLICATIONS

Martin Mihajlov et al, On designing usable and secure recognition-based graphical authentication mechanisms, Elsevier B.V. (Year: 2011).*

(Continued)

*Primary Examiner* — Shanto Abedin
(74) *Attorney, Agent, or Firm* — Bold IP, PLLC; Christopher Mayle

(57) ABSTRACT

A system and method that provides the ability for users to select, create, and upload a collection of graphical images whereby a web site login process presents the user with an array of graphical images including the graphical images designated for an authentication pattern, the graphical image authentication system then determines that the graphical images chosen by the user are correct or incorrect without notifying the user until the process is complete.

10 Claims, 10 Drawing Sheets

(56) References Cited

U.S. PATENT DOCUMENTS

| | | | |
|---|---|---|---|
| 2008/0244700 A1* | 10/2008 | Osborn | G06F 21/36 726/2 |
| 2009/0038006 A1 | 2/2009 | Traenkenschuh et al. | |
| 2009/0083850 A1 | 3/2009 | Fadell et al. | |
| 2009/0325661 A1 | 12/2009 | Gross | |
| 2010/0043062 A1 | 2/2010 | Alexander et al. | |
| 2010/0169958 A1* | 7/2010 | Werner | G06F 21/36 726/19 |
| 2011/0154482 A1* | 6/2011 | Heiner | G06F 21/36 726/19 |
| 2012/0005483 A1* | 1/2012 | Patvarczki | G06F 21/36 713/182 |
| 2013/0097697 A1 | 4/2013 | Zhu et al. | |
| 2013/0111571 A1 | 5/2013 | Jakobsson | |
| 2014/0059663 A1 | 2/2014 | Rajshekar et al. | |
| 2014/0087656 A1* | 3/2014 | Boelter | G06F 21/84 345/647 |
| 2014/0123261 A1 | 5/2014 | Blair | |
| 2014/0125574 A1 | 5/2014 | Scavezze et al. | |
| 2015/0281215 A1 | 10/2015 | Zia | |
| 2015/0349966 A1 | 12/2015 | Dimitrakos et al. | |
| 2016/0219036 A1* | 7/2016 | Devkar | H04L 9/3226 |
| 2016/0261586 A1 | 9/2016 | Huang et al. | |
| 2018/0114461 A1 | 4/2018 | Michalowitz et al. | |
| 2020/0042095 A1 | 2/2020 | Ang et al. | |
| 2020/0137066 A1* | 4/2020 | Erickson | H04L 9/3226 |
| 2020/0184052 A1* | 6/2020 | Ellison | G06F 21/36 |
| 2020/0311250 A1* | 10/2020 | Sandstrom | G06F 21/36 |
| 2021/0173916 A1* | 6/2021 | Ortiz | G07G 1/009 |

OTHER PUBLICATIONS

Noam Tractinsky et al, Beautiful secrets: using aesthetic images to authenticate users, DOI (Year: 2022).*

Paul Dunphy et al, A closer look at recognition-based graphical passwords on mobile devices, ACM (Year: 2010).*

Jonathan Citty et al, TAPI: Touch-screen Authentication using Partitioned Images Elon University Technical Report Jan. 2010 (Year: 2010).

* cited by examiner

SYSTEM AND METHOD FOR VERIFYING UNIQUE USER IDENTIFICATION

CROSS REFERENCE TO RELATED APPLICATIONS

The following is a continuation in part of U.S. nonprovisional patent application Ser. No. 17/316,224 filed on May 10, 2021 which is a continuation of U.S. nonprovisional patent application Ser. No. 16/938,938 filed on Jul. 25, 2020 which claims priority to U.S. provisional patent application #62/878,644 filed on Jul. 25, 2019, which are incorporated by reference their entirety.

FIELD OF DISCLOSURE

The overall field of this invention relates generally to the field of identification authentication. In particular, the invention is directed to an identity authentication system using verification through a sequential selection of graphical images and/or text terms and or other methods using rules designed by the user.

BACKGROUND

Every day millions fall victim to some form of identity theft. Whether the exposure is as simple as someone accessing a social media profile that was left active on a public computer or someone gaining access to a credit card from a personal or group security breach. One of the biggest reasons for this is the human element. The majority of passwords are extremely easy to remember such as 1, 2, 3, 4 or have been used throughout multiple sites even though passwords make up a critical part of our life in the age of the Internet. Passwords can be obtained through trickery like phishing attacks over email. Computer hackers have also found all sorts of ways to crack codes, find vulnerabilities, and bypass security barriers. These break-ins then create other layers of damages and exposure representing billions, perhaps trillions in dollars of damages.

Oftentimes, passwords have also been artificially created by computer programs and are stored in keychain passwords but these can be "sniffed" or read over Wi-Fi using scripts. Really well-written passwords are also harder to remember and usually are difficult to type, especially on a mobile device keyboard, which is now the most commonly used computing device among the general public. Thus, the stronger the password, the more difficult it is to type or remember.

There are other established ways for identifying the user's authentication such as utilizing biometric data from a thumbprint or a retinal scan. However, biometric data does not work 100% of the time and can be thrown off by something as simple as dirty fingers. This also can take extended amounts of time because the conversion of multiple biometric data into hash strings. Face recognition is also used but this can also be time consuming and there are documented issues with the technology authenticating users with similar facial structures, especially common with close family members such as twins.

Another problem with most authentication systems is that they actually verify if the password entered is correct or incorrect enabling a third party to understand and adjust to a negative response by entering a different password. This allows a third party such as a hacker to continue to try entering a series of different passwords because they are able to receive feedback each time the hacker enters a password.

Thus, exists a need for improving upon the verification of unique identification whereby the creator may design passwords that are complex to anyone other than the creator while being simple to understand and processed within a short amount of time.

SUMMARY

The present disclosure creates a password input system that is actually fun to use. The invention recognizes the unsolved need for a system and method that provides the ability for users to select, create, and upload rules such as utilizing a graphical image collection whereby a website login process presents the user with an array of graphical images including the graphical images from the graphical image collection as well as blank canvas or other background. The authentication system then determines that the selected array of graphical images as chosen by the user is correct. The authentication system is used as an alternative method or in conjunction with the traditional username/password architecture to increase the overall level of security whereby the user chooses the method of how they want to protect their identity.

The invention is designed to incorporate a human's innate ability to quickly recognize graphical images or other patterns. The users brain may associate elements within a subject, topic, or rule that do not exist except in the brains ability to make that association. As someone selects the graphical image, which best matches their objective; they will take another step towards final authentication. Users may pick from a selection of graphical images or upload their own set of graphical images. These graphical images can then be woven into a matrix of other user-supplied graphical images or graphical images collected from various other sources. Each user can define the proper process of their graphical images to match their unique or personal thought process. Users may easily expand or modify the selected set of graphical images by uploading new graphical images or changing the sequence or pattern of display.

The graphical image authentication featured in the present invention delivers a fundamental shift in the way passwords are created and authenticated. This is because during the authentication process there aren't any visual cues or acknowledgement that the user has entered a wrong or correct authenticator. An authenticator is the means used to confirm the identity of a user, that is, to perform digital authentication. A person authenticates to a computer system or application by demonstrating that he or she has possession and control of an authenticator. In contrast to the simplest standard, the authenticator is a common password. In this invention, after the user selects any wrong graphical image the appearance may remain unchanged, apart from the presentation of new images, and the user may continue viewing or scrolling through different matrixes and be none the wiser that they are selecting the correct graphical images in the image grid or sequence or are selecting the wrong images unless they know the specific combination of images. In fact, because one or more of the matrixes may have no correct graphical images that are within the password sequence, a user who does not know the authentication sequence might not even know they have initiated any steps in selecting a proper image sequence. The system also allows for different schemes and rules such as the use of numeral algorithms, matching images, finishing a familiar or popular song comprised of musical notes, selecting images while holding down a key corresponding to the image, or other criteria for the creation of an authentication pattern that would not be possible for another person to determine the user's thought process, logic or image sequence. The system is more analogous to an escape room where the room may have various objects but to solve the puzzles the user would need to first understand what is the puzzle and the rules designed for the puzzles. For instance, predetermined objects in the room may have different colors as well as every other object in the room but only the user knows these item are of value to the authentication pattern because they created the pattern. This becomes further complicated when the objects also have many other qualities acting as distractions such as: numbers written on them, what type of object, their location in the room, or a sound they make. This pattern would be impossible without certain clues, which are only stored in the user's mind and memory causing the puzzles to be unmanageable to solve for any third party because they do not even know rules for the puzzles.

Because this innovation offers no doorway to the database such as a text box entry, there is no way to do SQL injection. Using this method, there is no way to apply brute force to break through the authentication process and the user's steps and thought process are never recorded in any program. Also, there is no way to "save" the user's unique process, thus reducing the ability for hackers to gain access because there is no trace of the password anywhere. Since the knowledge only exists in the user's mind, the solution can be processed equally across numerous devices such as a family member's computer, which doesn't have a password management system, without hesitation or frustration.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
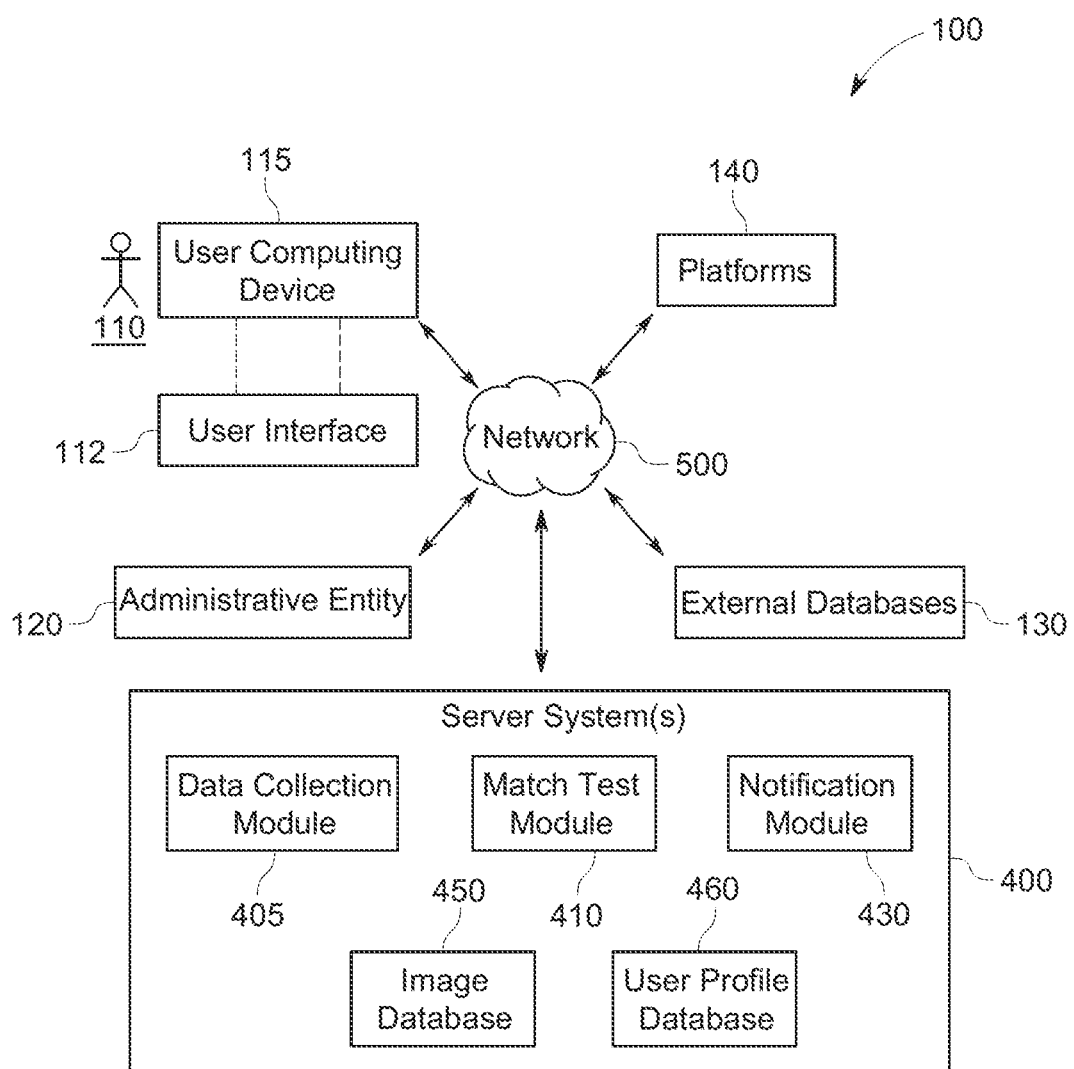
FIG. 1 depicts a schematic diagram of a user identification system, according to an illustrative embodiment.

FIG. 1 is a block diagram of a user identification system constructed in accordance with the principals of the current invention. User Identification System 100 may include one or more types of content that may be stored, collected, extracted, or acquired from a number of other users 110 wherein graphical images are collected by graphical image database such as graphical image database 450 on a server 400. Users 110 may be located in various physical locations that are either located apart or are located in the vicinity of one other. Users 110 of User Identification System 100 may access a user interface 112 with user computing device 115. User interface 112 may have a plurality of buttons or icons that are selectable through user interface 112 by user 110 to instruct User Identification System 100 to perform particular processes in response to the selections.

In one or more non-limiting embodiments, User Identification System 100 may be innate, built into, or otherwise integrated into existing platforms such as a website, third-party program, iOS, Android, Snapchat, Getty Images, Instagram, Facebook, etc. User computing device 115 may acquire various forms of graphical images from input devices installed or connected to user computing device 115 such as cameras or applications that may be configured to generate graphical images to be uploaded to User Identification System 100. In one or more non-limiting embodiments, graphical images may already exist in User Identification System 100.

User computing devices 115 may be in communication with one or more servers 400 such as server 400 via one or more networks such as network 500. Server 400 may be located at a data center or any other location suitable for providing service to network 500 whereby server 400 may be in one central location or in many different locations in multiple arrangements. Server 400 may comprise a database server such as MySQL® or Maria DB® server. Server 400 may have an attached data storage system storing software applications and data. Server 400 may receive requests and coordinate fulfillment of those requests through other servers. Server 400 may comprise computing systems similar to user computing devices 115.

In one or more non-limiting embodiments, network 500 may include a local area network (LAN), such as a company Intranet, a metropolitan area network (MAN), or a wide area network (WAN), such as the Internet or World Wide Web. Network 500 may be a private network, a public network, or a combination thereof. Network 500 may be any type of network known in the art, including a telecommunications network, a wireless network (including Wi-Fi), and a wire-line network. Network 500 may include mobile telephone networks utilizing any protocol or protocols used to communicate among mobile digital computing devices (e.g., computing device 115), such as GSM, GPRS, UMTS, AMPS, TDMA, or CDMA. In one or more non-limiting embodiments, different type of data may be transmitted via network 500 via different protocols. In further non-limiting other embodiments, user computing devices 115, may act as standalone devices or they may operate as peer machines in a peer-to-peer (or distributed) network environment.

Network 500 may further include a system of terminals, gateways, and routers. Network 500 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

User Identification System 100 may also include one or more administrative entities such as administrative entity 120. While administrative entity 120 is depicted as a single element communicating over network 500, administrative 120 in one or more non-limiting embodiments may be distributed over network 500 in any number of physical locations. Administrative entity 120 may manipulate the software and enter commands to server 400 using any number of input devices such as a keyboard and a mouse. The input/output may be viewed on a display screen to administrative entity 120.

Server 400 may comprise a number of modules that provide various functions related to User Identification System 100 using one or more computing devices similar to user computing device 115. Modules may include a data collection module such as data collection module 405, a match test module such as match test module 410, and a notification module such as notification module 430. Modules may be in the form of software or computer programs that interact with the operating system of server 400 whereby data collected in databases such as graphical image database 450 and user profile database 460 may be processed by one or more processors within server 400 or user computing device 115 as well as in conjunction with execution of one or more other computer programs. Software instructions for implementing the detailed functionality of the modules may be written in or natively understand, including but not limited to, C, C++, Visual Basic, Java, Python, Tcl, Perl, Scheme, Ruby.

Modules may be configured to receive commands or requests from a user's computing device 115, server 400, and other outside connected devices over network 500. Server 400 may comprise components, subsystems, and modules to support one or more management services for User Identification System 100. For instance, the operations of matching a user's selections with their passcode may be done by a match test module 410. During operation match test module 410 may be configured to analyze whether images selected by user 110 that make up an authentication pattern are within certain matching parameters during the validation process.

Figure 2:
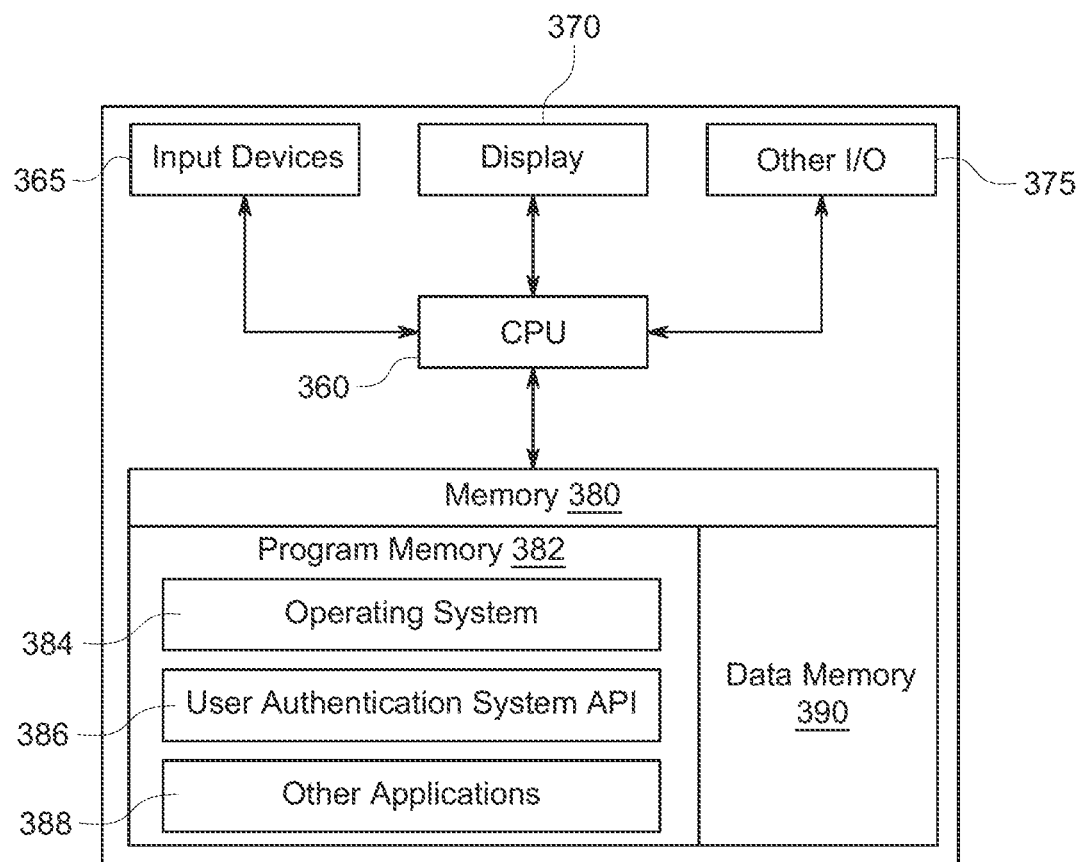
FIG. 2 depicts a schematic diagram of a computing device used in user identification system.

One or more embodiments of user computing device 115 are further detailed in FIG. 2. User computing device 115 may comprise hardware components that allow access to edit and query User Identification System 100. User computing device 115 may include one or more input devices such as input devices 365 that provide input to a CPU (processor) such as CPU 360 notifying it of actions. The selections may be mediated by a hardware controller that interprets the signals received from input device 365 and communicates the information to CPU 360 using a communication protocol. Input devices 365 may include but are not limited to a mouse, a keyboard, a touchscreen, an infrared sensor, a touchpad, a wearable input device, a camera or graphical image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU 360 may communicate with a hardware controller for devices, such as for a display 370. Display 370 may be used to display text and graphics. In some examples, display 370 provides graphical and textual visual feedback to a user.

In one or more embodiments, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 370 may also comprise a touchscreen interface operable to detect and receive touch input such as a tap or a swiping gesture. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU 360 may have access to a memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory. Memory 380 may include program memory 382 capable of storing programs and software, such as an operating system 384, API such as User Identification System 100 API 386, and other computerized programs or application programs such as application programs 388. Memory 380 may also include data memory such as data memory 390 that may include database query results, configuration data, settings, user options or preferences, etc., which may be provided to program memory 382 or any element of user computing device 115.

User computing device 115 may in some embodiments be mobile computing devices such as an iphone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of User Identification System 100 while in communication with network 500. User computing device 115 may have location tracking capabilities such as Mobile Location Determination System (MLDS) or Global Positioning System (GPS) whereby they may include one or more satellite radios capable of determining the geographical location of computing device 115.

Figure 3:
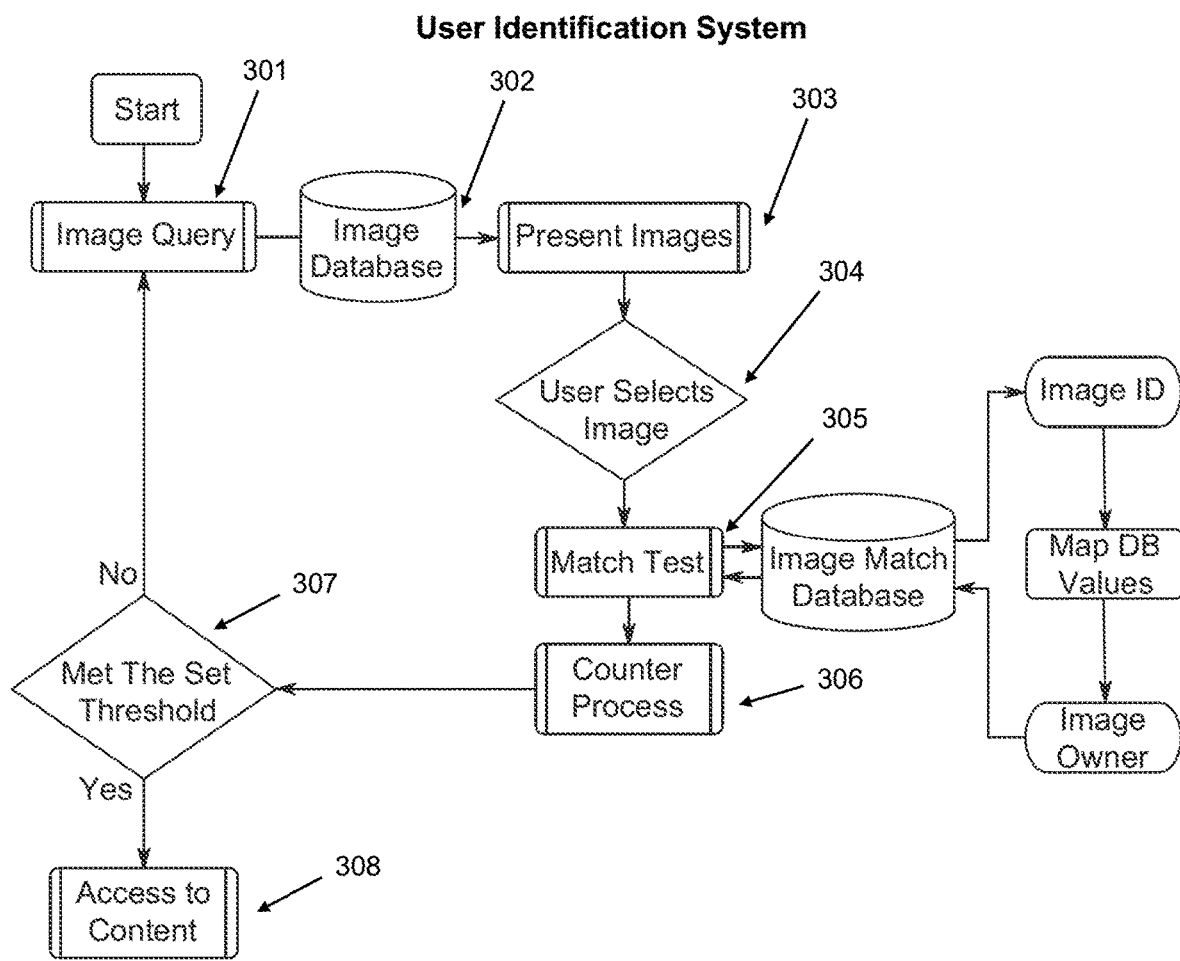
FIG. 3 illustrates a simplified flowchart diagram in connection with the present invention directed to a user identification system.

FIG. 3 illustrates an exemplary method depicting a flow diagram showing an embodiment of an exemplary method for implementing User Identification System 100 wherein one or more components included in FIG. 1, such as, without limitation, user computing devices 115, server 400, and network 500. User 110 may initially register to become a registered user associated with User Identification System 100 or any platforms which User Identification System 100 has been integrated with User Identification System API 386. Platforms may be downloadable and installable on user computing devices through an API. In one or more non-limiting embodiments, User Identification System 100 or platform may be preinstalled on user computing devices 115 by the manufacturer or designer. Further, User Identification System 100 may be implemented using a web browser via a browser extension or plugin.

Upon initially signing up with User Identification System 100, user 110 may initiate a creation session wherein user 110 may be prompted to provide an email address or other identifying sources such as a telephone number or unique ID wherein the unique ID is a series of alphanumeric characters of which user 110 wants to be identified. After entering an email address, user 110 may be presented with a text window interface or other screen whereby user 110 may enter their name, username, password, phone number and address.

In further embodiments, user 110 may establish one or more different profiles whereby the different profiles may individually be associated with specific roles of user 110. For instance, if a user 110 is acting as a business entity and as an individual person, this is non-limiting and all information pertaining to both may be accessible as well.

User 110 may authorize User Identification System 100 to access information or other data from external sources operated by user 110 such as their own enterprise network having a collection of graphical images whereby data collection module 405 is configured to collect information from the enterprise network and integrate the information into User Identification System 100. In one or more non-limiting embodiments, user 110 may be required to provide credentials to the third-party service provider to allow access by User Identification System 100. User 110 may also authorize social network access whereby when a social network service is linked to User Identification System 100, access may be granted to various accounts of user 110 and importing of data from those accounts may occur such as to import one or more social media graphical images. If user 110 authorizes access, data collection module 405 collects or otherwise accesses graphical images and stores the information in graphical image database 450 with an associated user 110 identifier.

In one or more non-limiting embodiments, upon successful authentication of user 110, a page may be presented to user 110 whereby user 110 will select or create one or more rules with one or more solutions to create an authentication pattern such as a graphical image, a musical serenade, a chemistry test, or electric circuit schematic. The rules may be in effect a predetermined number of screens specified by the user. Some rules may be prepared such that the user may select one already created. In previous technologies a user 110 would only pick a password based on the given system such as entering a string of text or picking emojis or images. With this invention, the user may provide multiple rules with multiple solutions. This furthers the concept of an escape room where a brute force attacker will need to know the rules set by user 110 as well as the solutions. For instance, a user 110 may create a first rule for selecting pictures with the most amount of red coloring when the display presents no images uploaded by the user while a second rule may be created where the user selects the images selected by them when they appear, and a third rule may be created where after selecting an image uploaded by themselves, the user then would select a musical note in order to complete a song they designed, and a fourth rule may be created where the user always selects the top right corner image no matter what is presented on every 4th grid displayed. This allows for an endless possibility of rules and solutions which can be designated to create a multi leveled authentication system.

User 110 has the ability to upload graphical images through user interface 112 to use in an authentication pattern wherein the graphical images are then collected by data collection module 405, whereby data collection module 405 stores graphical images on graphical image database 450 with corresponding identifiers to the respective user 110 at step 302. Graphical images may be any number of graphical image formats such as jpg, gif, raw or may be selected from multimedia files such as mpg, avi, .mov, etc. any computer definable graphical image format may be utilized for processing by User Identification System 100. In other non-limiting embodiments, graphical images may instead be any form of content such as audio, video, music, and other forms of content.

User interface 112 may allow user 110 to upload graphical images directly from a camera on user computing device 115 for authentication pattern. In one or more non-limiting embodiments, user 110 may search for graphical images whereby user interface 112 may include one or more selectable buttons to add graphical images. Graphical images may also come from an existing database stored on graphical image database 450 of server 400 or a third-party database that server 400 is in communication with, whereby server 400 may receive results from third-party databases such as existing databases already catalogued and indexed or sorted on platforms, such as Getty Images or Facebook already having a wide array of graphical images that may be selected by the user or system. Graphical images may be collected via a third-party camera and/or photos application wherein graphical images may be from application or source such as Snapchat, Facebook, Instagram, Amazon, eBay, Discord, Reddit, Twitter, etc. If a graphical image already exists publicly online, data collection module 405 may utilize any known network search methods, to initiate a content search or query for content. In one or more non-limiting embodiments, a crowd-source platform may be utilized wherein third-parties may search for content.

Depending on the platform, an authentication pattern may be comprised of a certain number of designated graphical images in the collection while in some embodiments the authentication pattern may be sequence specific wherein the authentication pattern may require the designated graphical images to be selected in a specific order in the collection. User interface 112 may present information to user 110 of the required number of designated graphical images needed for an authentication pattern as well as if the designated graphical images are needed to be selected in specific order in the collection.

After selecting a "Graphical Image Button", user interface 112 may display a screen allowing user 110 to upload another graphical image. After each graphical image has been selected by user 110, it is then determined if user 110 has selected the predetermined minimum number of graphical images. If no, user 110 may continue to select graphical images. If yes, user 110 may successfully complete the authentication pattern. The authentication pattern is then uploaded to user profile database 460. This number may be chosen by the user and adjusted.

The basis for the selection of graphical images by user 110 may be something that can be easily remembered by or associated with that specific user 110 or something of interest, such as but not limited to sports, music, or entertainment. For instance, user 110 may upload or select from an existing set of graphical images that relate to an abstract idea, such as French fries, Starry Night, and Van Gogh equivalent to or otherwise represents France. In another scenario Jerry Seinfeld would be equivalent to or otherwise represents New York, or a Flying Saucer and Space Needle equivalent to or otherwise represents Seattle. User 110 may upload or select from an existing set of graphical images that can be represented by a series of abstract ideas. For example, a sailboat may be represented by a series of abstract ideas as elements of a topic including graphical images of a lead for the keel, a compass Rose, a lead line, a plank of wood for the hull, a propeller, a roll of fabric for a sail, and a coil of rope.

User 110 may upload or select from an existing or AI generated set of pictures or graphical images that relate to a certain theme, such as "Wizard of Oz" where the graphical images selected or chosen may include a tornado, a corn field, a bail of straw, a human heart, slippers, an armored suit, a small dog, a monkey, or a witch's hat. A picture of scrambled eggs can be selected for random presentation. A picture of a domino may also be used to represent a sequential series. Selections such as these prevent an artificial intelligence entity or platform from deciphering a user's authentication pattern because they lack the cognitive association to recognize suitable graphical images to build the solution to the riddle.

User 110 may upload or select from an existing set of pictures graphical images that create a story from the user's own imagination wherein the graphical images may represent components of a story comprising a location, a setting, a protagonist, a topic, a series of stages, and an ending, whereby the group can still be recognized even if the sequence has been shuffled. For example, a "Mutiny on the Bounty" may be represented by a picture of a ship's deck with sailors and muskets aimed, breadfruits are loaded onto a ship represented by a picture of breadfruit, a ship burns in the harbor represented by a picture of a ship burning, a ship sets sail from London represented by a picture of old London harbor, an island is reached represented by a picture of Pitcairn Island, and a few sailors are set adrift in a small boat represented by a picture of men in a longboat such as Captain Bligh.

User 110 may also add more graphical images than are required to create an authentication pattern. User interface 112 may display a screen presenting the graphical images that have been selected during the creation process or after the process to user 110 whereby user may add, remove, or rearrange the sequence of the graphical images to create or modify the authentication pattern to increase the permutations thereby increasing the complexity.

In some embodiments user identification system 100 may have a conversion module that takes a user's 110 input of text or numbers and creates an image with those values embedded within the image. This may be an existing image either from user 110 or from an external image collection database or AI generated whereby conversion module applies the text of user 110 as an overlay and then reduces the combination to a single layer. For example, a user 110 may input "Seattle" and the conversion Module would provide user 110 with a number of selected images suitable to represent Seattle. User 110 may then select a landmark such as the Space Needle as a preferred image. Conversion module may generate an image containing both the image of the Space Needle and the term Seattle. In or more non-limiting embodiments, the text may be fuzzy or distorted to make it more secure from machine-reading attacks.

Numbers, terms, and other forms of text or indicia may be embedded into an image whereby user 110 may understand the text while preventing the text from being machine readable. This provides another mode of difficulty for the hackers to crack. An example may be that there is an image of five apples to represent the number "5" or this may be represented by a starfish with 5 limbs. Another example may be that there is an image of the number "4" or the roman numeral "IV" or an image of a square. By moving from text to an image, the presentation and digital transfer does not expose the meaning or value of the element within the logic process.

Upon successful selection of the required number of graphical images, User identification system 100 may present to user 110 through user interface 112 the ability to finish completing the creation of the authentication pattern.

When user 110 initiates an authentication session, user 110 may be prompted to enter their existing unique ID, through user interface 112, to initiate an authentication session. Once an existing User ID has been entered by user 110. A page or pop-up window may be generated by data collection module 405 using graphical images databases 450 that may be visible to user 110 including graphical images that were uploaded or selected by user 110 during the initiation session when selecting an authentication pattern at step 303.

The page or pop-up window may comprise a dynamic graphical grid having one or more graphical images represented by cells wherein the graphical images are collected by data collection module 405 and stored in graphical image database 450.

Figure 4:
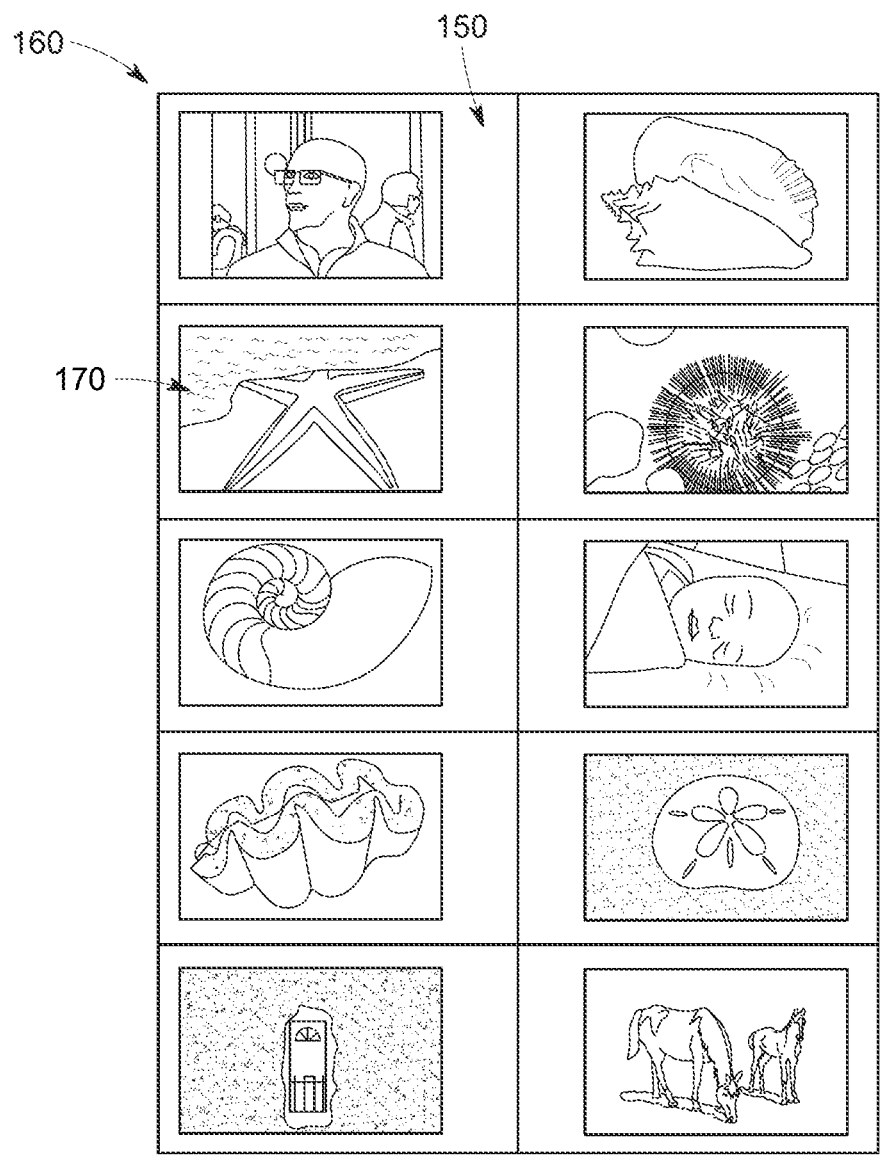
FIG. 4 illustrates a dynamic graphical authentication grid that includes various graphical images.

An embodiment of a grid of graphical images that appears to user 110 is illustrated in FIG. 4. Cells such as cells 150 of a grid such as grid 160 may display a variety of graphical images such as graphical images 170. The cells are oriented in a predetermined arrangement such as a 2×5 grid however this is non-limiting and the grid arrangement may be of any size, shape, or orientation. User may define a custom criteria for display. Cells 150 of grid 160 may display graphical images collected form graphical image database 450 and may be displayed to user 110 according to a predetermined arrangement or pattern. The location of the graphical images in grid 160 may be randomized. The specific graphical image for each grid 160 may be chosen randomly from graphical image database 450 such as having a grid 160 with no graphical images 170 that are a part of user 110 photo pass or authentication pattern. In other non-limiting embodiments, each or all of these properties are not required to be dynamic and may be static instead during or in between authentication processes.

Designated graphical images may be selected by user 110 as a photo pass or authentication pattern during the particular authentication process. User 110 may locate any designated graphical images displayed within the predetermined arrangement that are part of the user's 110 authentication pattern created during the creation session. In order to enhance security, the designated graphical images may be randomly displayed on the screen.

The page or pop-up window may comprise a dynamic graphical grid 160 having no graphical images that are designated images of user's 110 authentication pattern. When this screen is presented, user 110 may select any image and proceed through multiple pages comprising dynamic graphical grids 160 by selecting the graphical image with a mouse and keyboard or through the touchscreen until they recognize a graphical image that is a component of user's 110 authentication pattern.

User 110 may proceed to select the graphical image on a grid 160 according to their respective authentication pattern by selecting the graphical image with a mouse and keyboard or through the touchscreen at step 304. Once user 110 has selected a graphical image, the specific graphical image selected by user 110 may be processed by match test module 410 for validation to determine if the selected first image is equivalent to the first graphical image in the authentication pattern created during the enrollment process at step 305.

Figure 5:
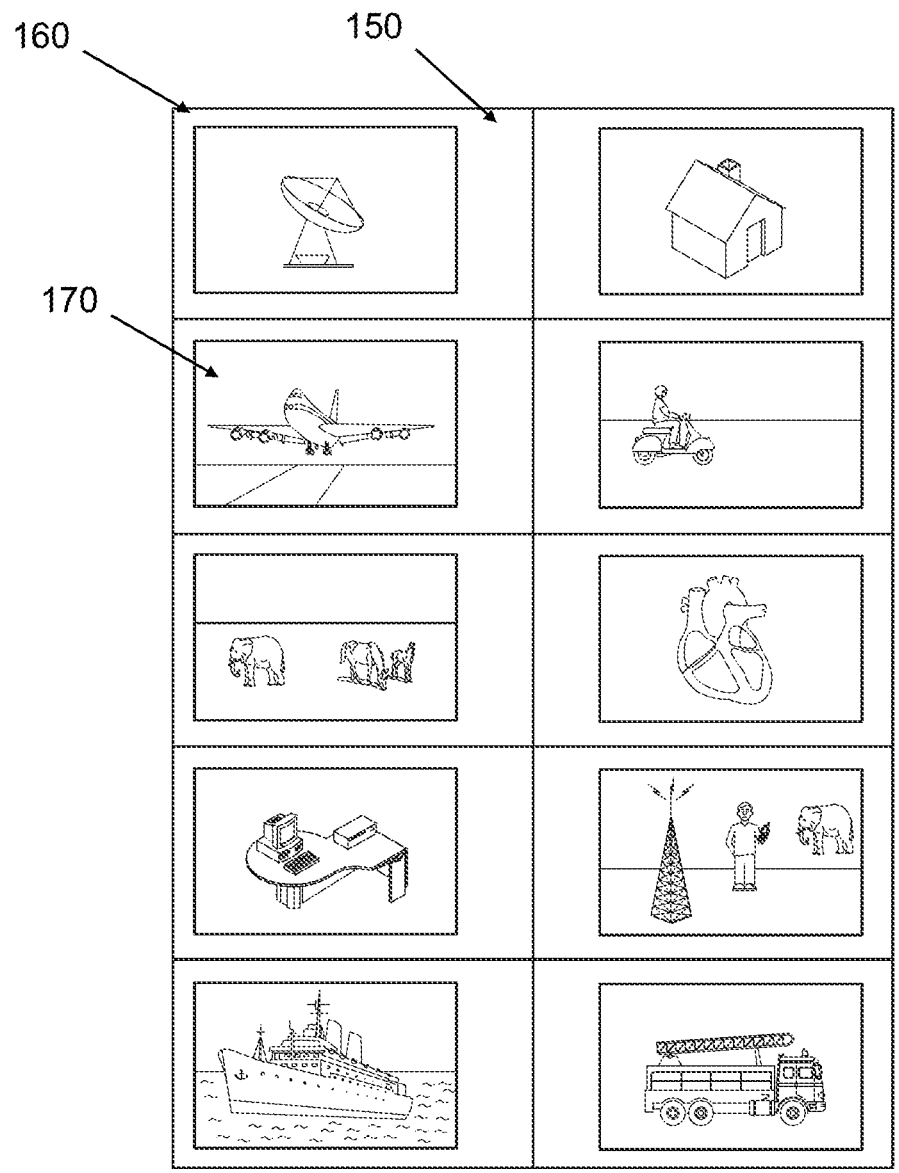
FIG. 5 illustrates an additional dynamic graphical authentication grid that includes various graphical images.

If the specific graphic image is validated at step 306, the first step in the authentication process may conclude successfully, and user 110 may be presented by data collection module 405 another screen with dynamic graphical grids 160 having the second image in the authentication pattern or pages without the second image in the authentication pattern whereby user 110 may select random images until they are presented with a page having the second image in the authentication pattern as illustrated in FIG. 5. In some embodiments, user 110 may be required to select a certain graphical image such as the top left on pages that are presented before the page with the second image in the authentication pattern. If the specific selection of a graphical image is not valid, data collection module 405 may present one or more pages of dynamic graphical grids 160 to user 110 to restart the process. Some of the pages may have one or more graphical images in the authentication pattern while other pages may not have any graphical images. If the incorrect graphical image is selected, user 110 would not know because there is information returned to the user that signifies a correct attempt or failed attempt by user 110.

In some embodiments, User Identification System 100 may implement a process to delay and thereby defeat brute force attack wherein after each failed attempt, user authentication system 100 waits for an increased number of seconds, such as but not limited to a rate of T*A wherein T is the amount of the time and A is the number of attempts. For example, if T=5, then after 1 attempt, user authentication system 100 may wait 5 seconds to display the next page, at the second failed attempt, the system causes a delay for 5*2-10 seconds to display the next page. The time may also be based on a rate calculated by addition or exponentials.

This method is designed to defeat hackers by creating the illusion that the system is slowing down and not worth the trouble of trying to guess an authentication pattern. This process may be initiated after the first time a user 110 does not recognize the first graphical image in the authentication pattern and selects a wrong image on the page, or when user 110 has correctly selected the first graphical image in the authentication pattern correctly but subsequently selects a wrong graphical image when the second graphical image is present on a page. The process may be initiated at any other time or after any correct number or incorrect number of selections.

User 110 may proceed to select another graphical image on a grid 160 according to their respective authentication pattern by selecting the graphical image with a mouse and keyboard or through the touchscreen. The second and latter graphical images in the authentication may in some embodiments be displayed to user 110 once user 110 has correctly selected the first graphical image in the authentication pattern. In other non-limiting embodiments, the second and latter graphical images may be presented at any time during the authentication process. In some embodiments, the second and latter graphical images in the authentication pattern may be displayed a predetermined percentage of the time after user 110 has correctly selected the first graphical image in the authentication pattern. Once user 110 has selected the second graphical image, the second specific graphical image selected by user 110 may be processed by match test module 410 for validation.

If the second specific graphic image is validated, the second step in the authentication process may conclude successfully, and data collection module 405 may present user 110 with another screen containing a dynamic graphical grid 160 having the third image in the authentication pattern. If the specific selection of a graphical image is not validated, data collection module 405 may present another page of dynamic graphical grids 160 with the first graphical image in the authentication pattern or without a graphical image in the authentication pattern of user 110 whereby user 110 may select a graphical image on each page until the first graphical image in the authentication pattern is presented.

This pattern may continue from step 301 until the authentication pattern has been completed or a set number of correct images has been validated by match test module 410 at step 307, wherein user 110 is able to access content for their respective User ID on the platform at step 308.

In one or more non-limiting embodiments, user 110 may not be required to select graphical images in the authentication pattern in a specific order and may only need to select a graphical image that is in user's 110 authentication rules. In one or more non-limiting embodiments, user 110 may only be required to reach a predetermined threshold level to access content on a platform. For example a "score" of 80% or a net value of the selected images may be used as the trigger.

In one or more non-limiting embodiments, user's 110 selections may be assigned a points value whereby once user 110 has selected a certain number of images that are in the authentication pattern they may be granted to access content on a platform. For instance, a positive point value such as but not limited to +1 may be given when an image selected by the user is related to the authentication pattern. A negative point value such as but not limited to −5 may be given when an image selected by the user is not related to the authentication pattern. An example may be where user 110 is granted to access content on a platform if they acquire a current value of 5. If user 110 began the process by selecting two subsequent images not related to the authentication pattern, user 110 would have a current value of −10. User 110 would then need to select 15 subsequent images related to the authentication pattern to reach the threshold to be granted access to a platform.

A timed lockout of a predetermined number of minutes may be implemented after a predetermined number of attempts at inputting an authentication pattern to eliminate the threat from brute force attacks by hackers or artificial intelligence solving algorithms. In other non-limiting embodiments, a timer may be set to prevent or slowdown the next attempt by user 110 to input an authentication pattern during the authentication session. With each failure, the timing may be increased by addition, multiplication, or exponential power.

In further non-limiting embodiments, designated images, authentication patterns, or collections may be shuffled at each stage or level. Also, each time a user 110 initiates a session, they may be able to use a different authentication sequence. User Identification System 100 may also allow user 110 to input a User ID and traditional password where the image authentication phase works in conjunction with the traditional phase, creating a two-step authentication.

In some embodiments, User Identification System 100 may determine whether user 110 is within a predetermined distance of a geographic area selected by user 110, within a certain distance of the last time user 110 successfully was verified, or a selected area by user 110, system 100, or a third party. If user 110 is not within the predefined distance of user 110, data collection module 405 may never present to user a graphical image in the authentication sequence or never allow verification.

In some embodiments, User Identification System 100 may determine whether user 110 is within a predetermined time period selected by user 110, within a certain period of the day, month, or year, or after a predetermined amount of time when user 110 successfully was verified. If user 110 is not within the user's 110 predefined time period, data collection module 405 may never present to user a graphical image in the authentication sequence or never allow verification such that the geolocation must conform to a user's routine as defined by the user in setting the rules.

Figure 6:
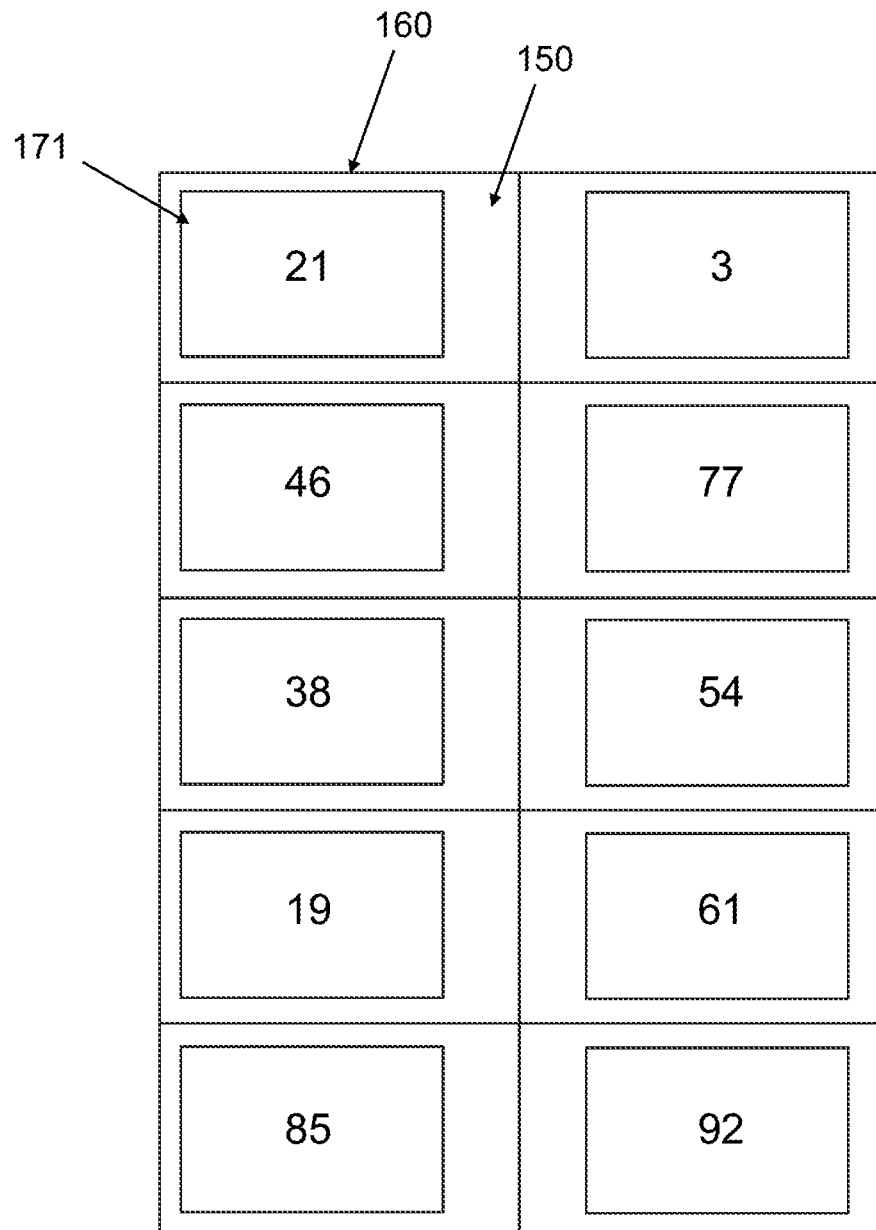
FIG. 6 illustrates an additional dynamic graphical authentication grid that includes various numbers.

In one or more non-limiting embodiments, a grid 160 may be presented to user 110 wherein grid 160 may correspond to different numerals, such as numbers 171 between one (1) through one hundred (100) as illustrated in FIG. 6. User 110 may then select an authentication pattern in the form of a number wherein user 110 may select various numerals on grid 160 that may be calculated to be equivalent or otherwise correspond to the authentication pattern number. For example, authentication pattern number may be correctly chosen by selecting numerals 171 that the authentication pattern number is wholly divisible with no remainder. The numerals may be applied to any location on a grid 160 or any different feasible combination or arrangement. This prevents other users from verification such that they would not be able to detect if the authentication pattern is based on the selection of graphical images or numeral patterns. The user selection pattern could be three even numbers followed by three odd numbers or alternating between even numbers and prime numbers or numbers that are divisible by three.

Figure 7:
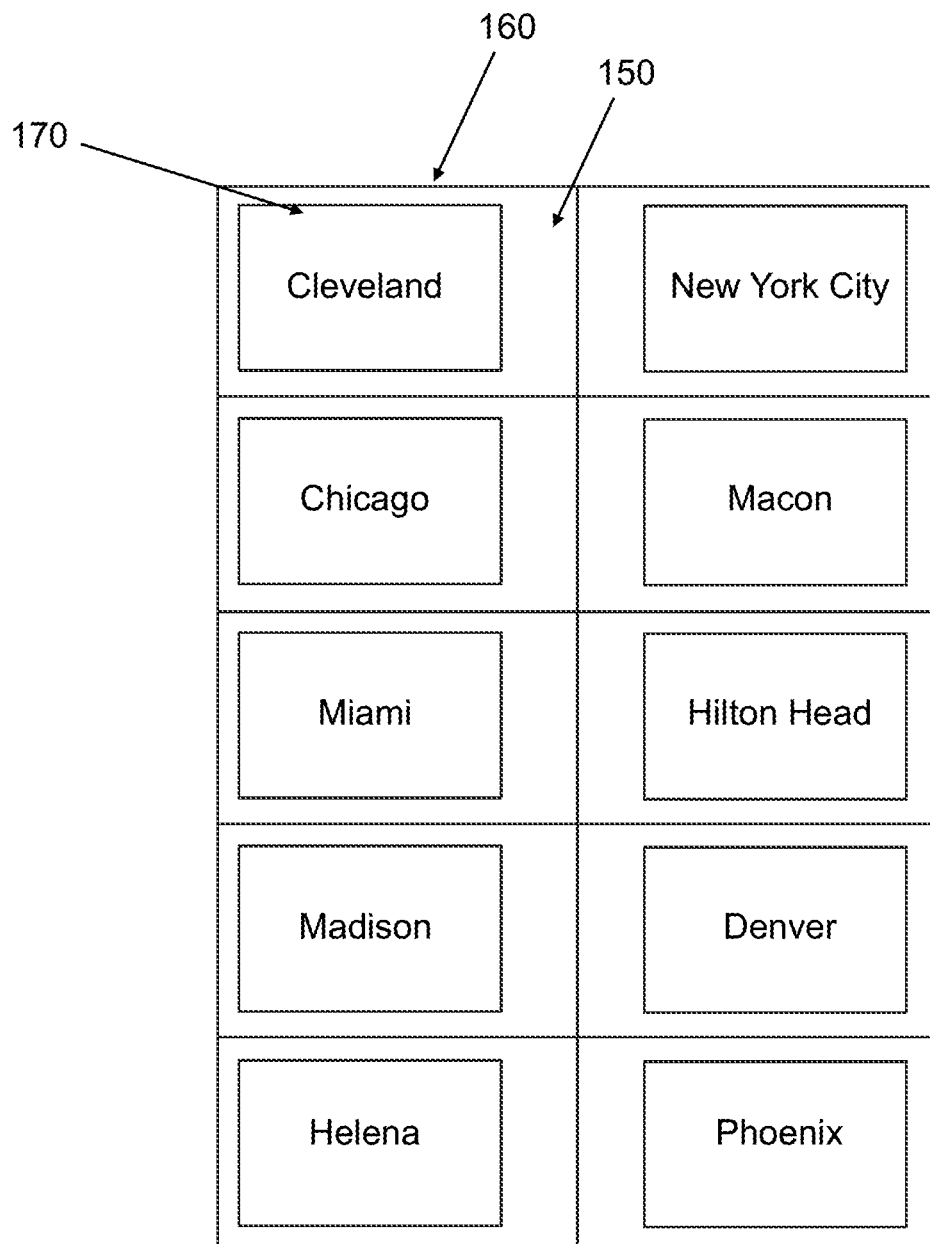
FIG. 7 illustrates an additional dynamic graphical authentication grid that includes various cities.

In one or more non-limiting embodiments, a grid 160 may be presented to user 110 wherein grid 160 may correspond to different cities, such as cities throughout the United States as illustrated in FIG. 7. During the authentication process, data collection module 405 would present to user 110 cities in a similar manner to the graphical images, but instead of selecting graphical images, user 110 would select cities that comprise the authentication pattern. For instance, authentication pattern may be made up of cities in Florida (Miami). In the user interface, a legend or ledger may be presented to the user such that they may have awareness of what rule is being applied. The legend or ledger may also be in code such as a picture or image.

Figure 8:
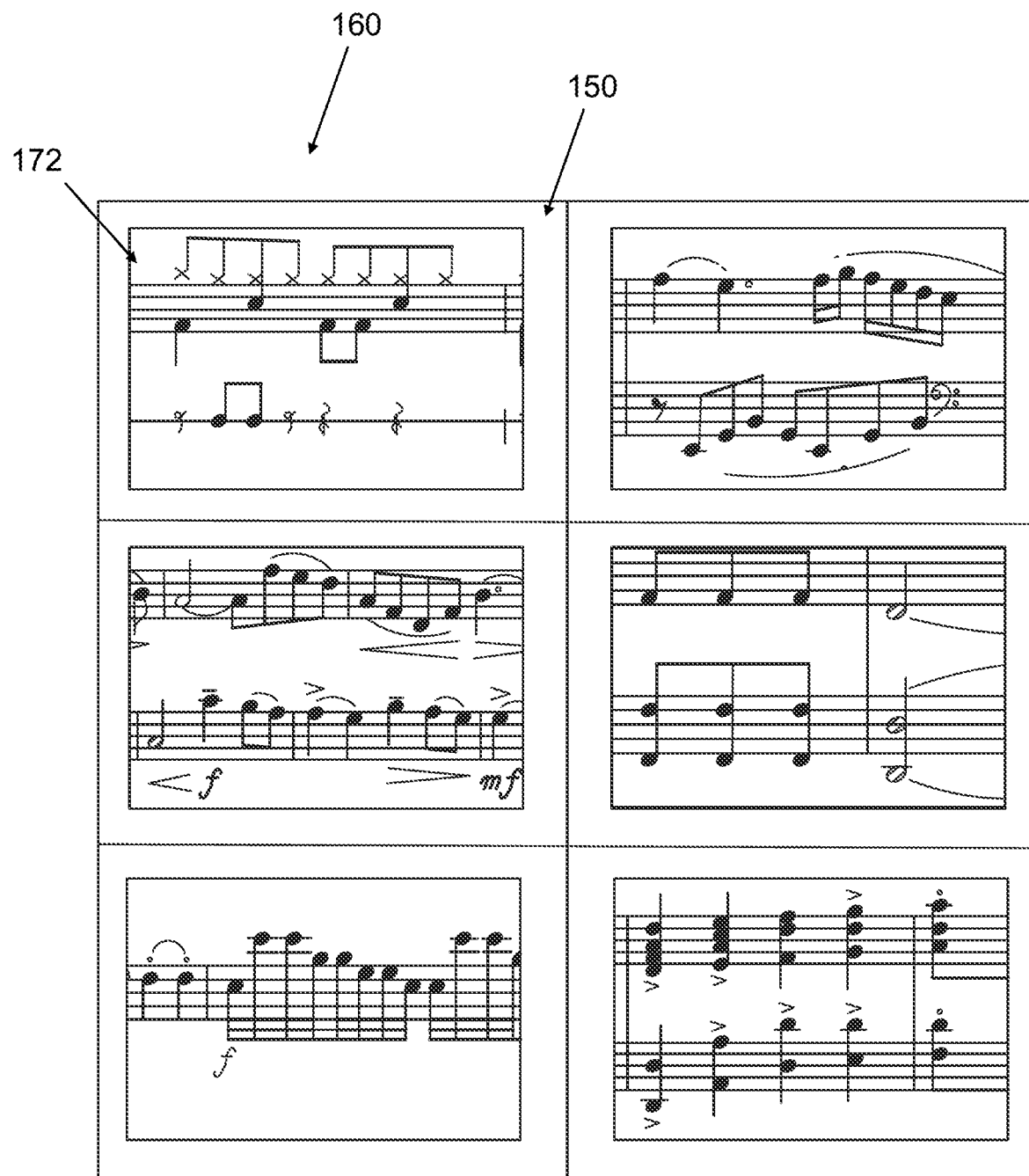
FIG. 8 illustrates an additional dynamic graphical authentication grid that includes various musical notes.

In one or more non-limiting embodiments, a grid 160 may instead be comprised of musical notes 172 or any other object instead of a graphical image as illustrated in FIG. 8. In the enrollment process, user 110 may select an authentication pattern comprised of musical notes of an existing musical score or a musical score created by user 110. During the authentication process, data collection module 405 would present to user 110 musical notes in a similar manner to the graphical images, but instead of selecting graphical images, user 110 would select musical notes that comprise the authentication pattern.

In one or more non-limiting embodiments, a grid 160 may instead be comprised of an electrical circuit system. In the enrollment process, user 110 may select an authentication pattern comprised of a different circuitry. During the authentication process, data collection module 405 would present to user 110 circuits in a similar manner to the graphical images, but instead of selecting graphical images, user 110 would select circuits that comprise the authentication pattern as defined by the user during account setup or initiation.

In one or more non-limiting embodiments, a grid with a predetermined number of images (20, 30, etc.) may be presented. Each image may have a checkbox or other selectable icon to select and retain this selection with a visual factor to indicate that the element has been selected. To authenticate, user 110 would need to select all of the correct elements and not one of the wrong decoys presented in the grid. This may be presented on a single screen with a single submit button, which may be selected after selecting the correct elements.

With each authentication session, the arrangement of the elements may be randomized. The elements that are presented may be a subset of countless images or terms (both correct and incorrect) thereby providing unique presentations for each and every session whereby it almost never repeats.

In one or more non-limiting embodiments, instead of a grid 160 being presented to user 110, user 110 may utilize various touchscreen gestures such as "drag and drop" or pattern creation wherein user 110 "drags" their finger between graphical images to create a pattern on the display to add another layer of security wherein touch gestures may operate to match different corresponding images to one another. In this example during the enrollment process, user 110 may select various graphical images and connect them to other graphical images. The authentication process is similar to selection of graphical images, however, user 110 now "drags and drops" graphical images onto connected graphical images or user 110 drags their finger in a pattern on the display In one or more non-limiting embodiments, instead of a grid 160 being presented to user 110, user 110 may utilize various touch screen gestures to add another layer of security wherein touch gestures may operate as a confirmation or denial of a graphical image 170 being a part of the authentication pattern as illustrated in FIG. 9.

User 110 may navigate through the set of presented graphical images by swiping through a stack of graphical images 170. Users may express approval of a presented graphical image 170 being a part of the authentication pattern by performing a touch gesture such as a right swipe gesture or express denial of the presented graphical image 170 being a part of the authentication pattern by performing a left swipe gesture. Other suitable gestures or manners of interacting with user interface 112 may be used, such as tapping or selecting portions of the screen. For example, User 110 may upload or select from an existing set of pictures graphical images 170 that closely relate to their preferences of food. So, if user 110 does not like cabbage but loves broccoli, they may choose a graphical image of broccoli to be a part of their specific authentication sequence and express denial to a presented graphical image of cabbage.

Figure 9:
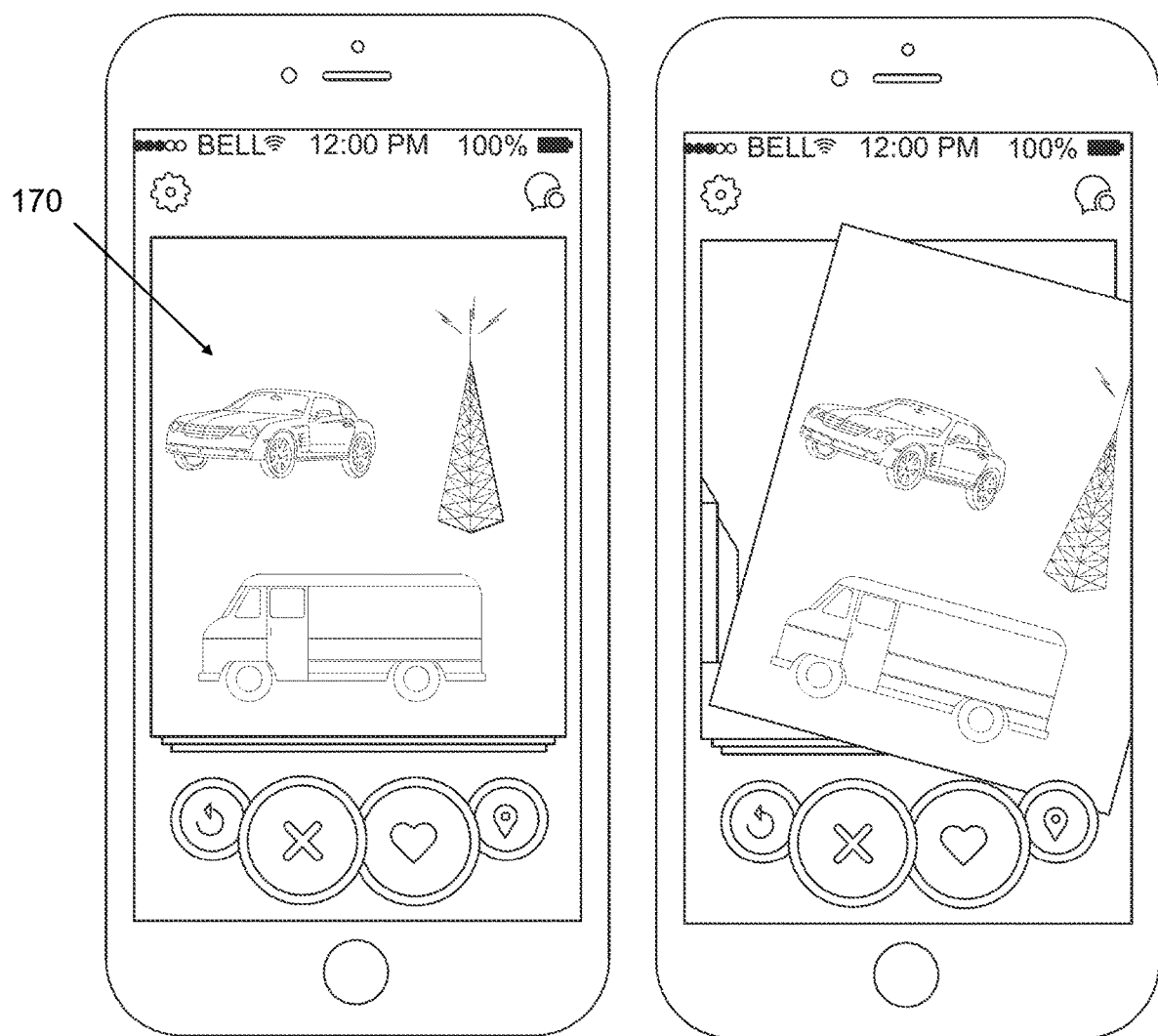
FIG. 9 illustrates a gesture interface with a stack of graphical images.
Figure 10:
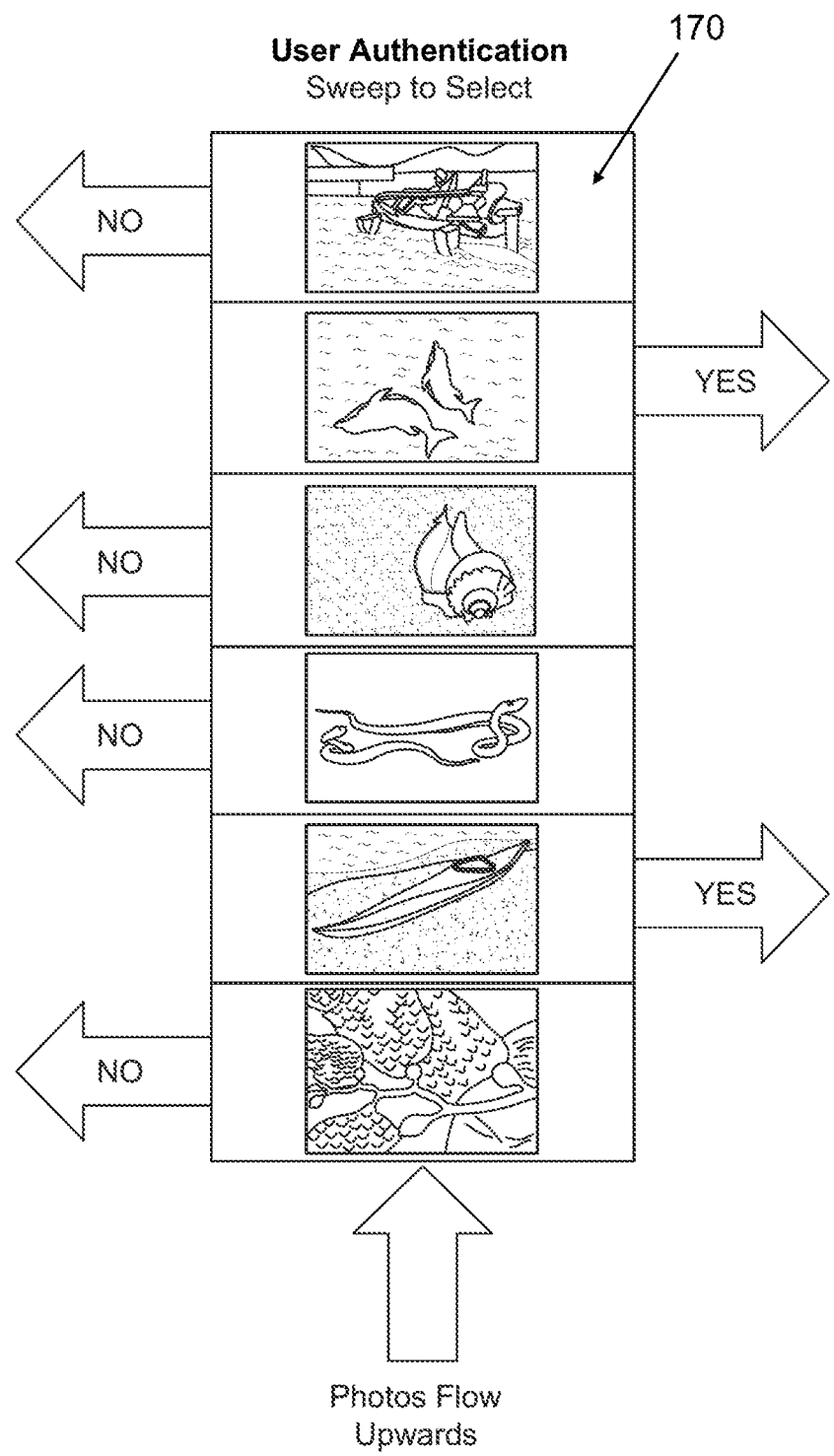
FIG. 10 illustrates a gesture interface with a tower stack of graphical images.

In a similar manner to FIG. 9, FIG. 10 illustrates a stack or scaling tower of graphical images 170 presented to user 110 whereby user 110 may utilize various touchscreen gestures to operate as a confirmation or denial of a graphical image 170 being a part of the authentication pattern. Once user 110 has swiped on a specific graphical images 170, graphical images 170 may move up the tower filling into the spot of the previous graphical images 170 that was swiped upon whereby a certain number of graphical images 170 appear on screen.

In one or more non-limiting embodiments, image may be divided into regions called hotspots. The authentication pattern of the user may be made of these hotspots such that depending on the location where the user selects the image may determine if the user has selected the correct hotspot in the authentication pattern or the incorrect hotspot. In some embodiments user 110 may select hot spots unrelated to any specific image whereby instead of picking select regions on an image based on the image user 110 would be picking the regions regardless of what image is presented. For instance, the authentication pattern may be four corners (top left, top right, bottom left, bottom right) whereby user 110 would sequentially select these spots with one selection on each image. If someone was attempting to steal user's 110 authentication pattern, they would not think user 110 is picking specific parts of an image and not realizing the image in fact does not matter to the authentication pattern.

In further embodiments, User Identification System 100 may create artificial or AI generated images and text strings that will be in grid 160. This process may begin by receiving an original image as input from user 110. The image may then be preprocessed to normalize its size, color, and other features to fit the requirements of the artificial intelligence model. The artificial intelligence model may be deep learning model, such as a convolutional neural network (CNN), which may be used to analyze and extract features from the original image to identify textures, colors, shapes, and any identifiable patterns or objects. User Identification System 100 may then determine how they want the new images to differ from the original based on how much security is needed. This could include changes in color, addition or removal of elements, style changes, etc. Alternatively, the system can randomly generate these parameters within predefined limits to ensure the output images are similar yet distinct from the original.

User Identification System 100 may include a generative model, like a Generative Adversarial Network (GAN) or Variational Autoencoder (VAE), or Chat GPT then uses the extracted features and modification parameters to generate new images. These models are capable of creating new content that is similar to the input data but with the specified variations, which can be part of the user's rules.

The generated images are post-processed to refine details, adjust resolutions to ensures the quality of the output images and that they meet the required specifications. User Identification System 100 may include a feedback loop where the generated images are evaluated against the user's requirements of what they wish the decoy images to be. If the images do not meet the desired criteria, the system can adjust its parameters and regenerate the images. User Identification System 100 then may output The final set of images, which are similar to the original but with the specified differences, and be presented to the user on grid 160. The artificial images may be used multiple times for each time the user attempts to solve the password or may be deleted and recreated each time.

In one non-limiting embodiment when the user uploads just 6 images there may be 720 permutations when selecting all 6 items from a collection of 6 items, where the order of selection matters. If the user steps it up just a bit, by uploading 10 images there are 151,200 permutations when selecting 6 items from a collection of 10 items, where the order of selection matters. In another non-limiting embodiment, the user uploads 10 images and requires the selection of 10 images whereby there are 3,628,800 permutations when selecting all 10 images from a collection of 10 images, where the order of selection matters. If a user wishes to take this system to a more extreme degree of security—i.e., harder to hack, the user can upload 20 images that they intimately know. With this implementation, the user can select a randomizing option whereby any one of these 20 images can be presented during the authentication process. With this scenario, every authentication session will be unique (and dramatically different from the previous session) and impossible for an "over the shoulder" hacker to crack.

What is even more dramatic with this method is the ability of the system to allow a user to make multiple mistakes. The system is constantly recalculating the net value of correct and incorrect selections. So, if a user were to just make a few mistakes, the number of possible permutations surges towards infinity.

In summary, here are three example levels:

Beginner User: 720 permutations to select 6 images from 6 images.

Advanced User: 151,200 permutations to select 6 images from 10 images.

Extra Advanced User: 3,628,800 permutations to select 10 images from 10 images.

In each example above, the user is in complete control of the level of security. In the current and typical state of art for password security, the user is confined to accept the website's requirements for elements such as: minimum/maximum number of digits, upper case, lower case, number, and wild-card character. In the popular current password services, the user is not offered a method to modify these rules.

During use, the user may be offered a selection of controls to set the following values:

The threshold score required to reach or gain access.
The number of allowed images for the master set.
The positive value for each correct image selected.
The negative value for each wrong image selected.

Basically, with this innovation, a user will effectively have millions of different login sessions. Even if someone were able to capture the user's selections in a session, the next session will be different. In fact, the probability of a repeat session is very close to zero.

As discussed, a similar method may be used for text strings whereby similar but not duplicate text strings may be implemented as decoy selections. The system may use AI to create similar text strings with comparable length and language, wherein for example, the similar text strings are configured to be pulled from a library of the text strings that are tagged with the language, length, and other attributes, whereby a close appearance of presented text strings makes it harder for anyone to guess the correct selection. For instance, a user may supply their favorite literature or movie quote as a component of the passcode whereby similar quotes from the same book or movie or creators may be applied.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

The invention claimed is:

1. A computing system for allowing access to a secure area through a determination process, the computing system comprising: a memory and one or more processors, wherein when creating an account, a user contributes one or more self provided content, wherein when logging in on a computing device, the user is presented with a multiple array of content within which the one or more self provided content is included as one or more elements that are presented and artificially created decoy images using an adversarial network that are similar in general appearance based on predefined parameters within the computing system, wherein the user selects their content element, which they recognize as their own because they made a content contribution, wherein each user selection, a score value increases when correct or decreases when incorrect, calculated by the one or more processors of the computing system, wherein the score value is greater than a predefined level, the user is granted access, by the one or more processors of the computing system, to the secure area on the computing device.

2. The computing system of claim 1 wherein the user can contribute their own images or text, wherein the user can also select images from a source, wherein for text string contribution, as an example, the user can use a quote from their favorite literature or movie quote.

3. The computing system of claim 1 wherein the content contribution of the user is in a form of text strings, wherein the computing system presents an array of similar text strings with comparable length and language, wherein for example, the array of similar text strings are configured to be pulled from a library of similar text strings, which are tagged with the comparable length and language and other attributes, wherein a close appearance of presented text strings makes it harder for anyone to guess a correct selection.

4. The computing system of claim 1, wherein the user can modify the score value level for concluding an authentication determination.

5. The computing system of claim 1, wherein the user is presented an array where none of the content was submitted by the user, such that any user selection merely reloads with a next array while making no change in the score value, wherein when in this mode, outside parties watching conducted steps will be misled to think this false step is part of login requirements.

6. A computer-implemented method for secure user authentication, comprising:
  receiving, by one or more processors, user-contributed content for creating an authentication pattern;
  generating, using a machine learning model, a plurality of artificially created images based on the user-contributed content, wherein the artificially created images are visually similar to but distinct from the user-contributed content; storing the user-contributed content and the artificially created images in a secure database;
  presenting, during an authentication attempt, a dynamic array of images including at least one piece of the user-contributed content and multiple artificially created images;
  receiving user selections from the presented array; calculating, in real-time, an authentication score based on the user selections, wherein the authentication score increases for correct selections and decreases for incorrect selections; and
  dynamically adjusting the presented array based on the calculated authentication score; granting access to a secure area when the authentication score exceeds a predefined threshold.

7. The computer-implemented method of claim 6, wherein
  generating the artificially created images comprises:
  analyzing, using computer vision algorithms, visual features of the user-contributed content; inputting the analyzed features into a generative adversarial network (GAN);
  generating, by the GAN, the artificially created images that maintain key visual characteristics of the user-contributed content while introducing controlled variations.

8. The computer-implemented method of claim 6, further comprising: adaptively modifying a difficulty of distinguishing between the user-contributed content and artificially created images based on a user-defined or system-determined security level.

9. The computer-implemented method of claim 6, wherein the user-contributed content comprises user-contributed text strings, and generating artificially created images comprises:
  analyzing semantic and syntactic features of the user-contributed text strings;
  generating, using a natural language processing model, artificial text strings that are semantically and syntactically similar to the user-contributed text strings; and
  converting the artificial text strings into image format for presentation in the dynamic array.

10. A system for secure user authentication, comprising: a memory and one or more processors that cause the system to perform operations comprising:
  receiving user-contributed content for creating an authentication pattern; generating, using an artificial intelligence model, a plurality of decoy elements based on the user-contributed content, wherein the plurality of decoy elements are designed to be visually or semantically similar to the user-contributed content;
  generating parameters for predefined limits of difference between the plurality of decoy elements and the user-contributed content;
  presenting, during an authentication session, a dynamic interface containing a mixture of the user-contributed content and decoy elements; and
  analyzing user interactions with the presented interface to determine authentication success without providing explicit feedback on individual selections.

* * * * *